Sept. 17, 1963   R. J. MONTZ   3,104,113
STEP-CLIMBING ENDLESS TRACK TYPE HAND TRUCK
Filed Aug. 22, 1961
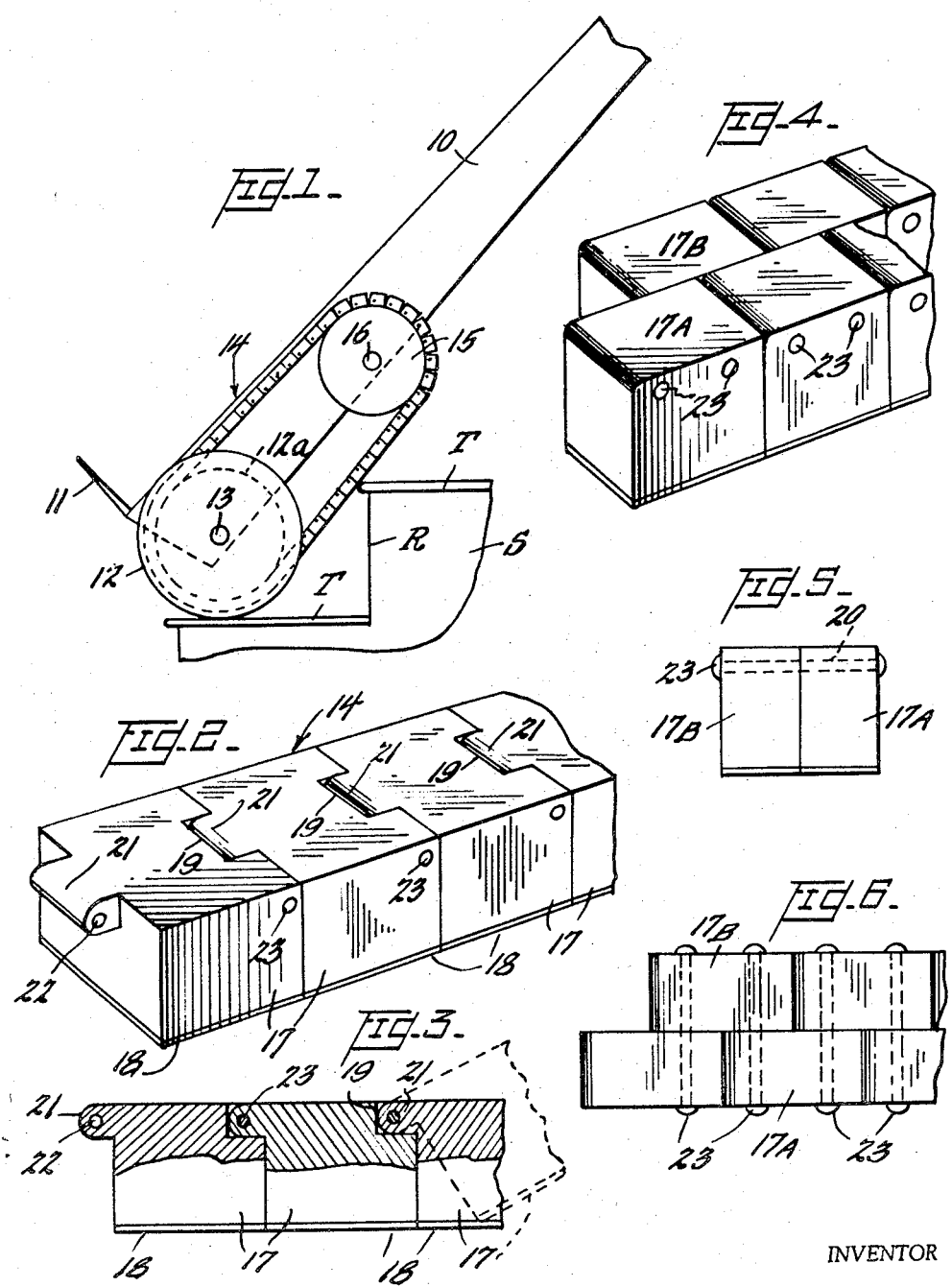
INVENTOR
R. J. Montz,
BY Tashof & Ascheroff
ATTORNEYS 3,104,113
STEP-CLIMBING ENDLESS TRACK TYPE HAND TRUCK
Roy J. Montz, P.O. Box 426, La Place, La.
Filed Aug. 22, 1961, Ser. No. 133,234
1 Claim. (Cl. 280—5.22)

This invention relates to a tractor type hand truck. In particular it relates to such a truck used to transport bulky articles packed in cartons, such as furniture, refrigerators, television sets, and the like. It is well known that hand trucks of the size ordinarily used for this work cannot be drawn over curbs, single steps, or flights of steps, where the height of the riser is greater than the radius of the wheels of the truck.

An object of the present invention is to provide a hand truck which can be drawn up a flight of stairs as easily as the ordinary truck up a ramp.

Another object of the present invention is to provide a hand truck having a continuously running tractor tread which will enable the hand truck to be drawn up a flight of stairs.

A further object of the present invention is to provide a hand truck having a continuously running tractor tread to facilitate drawing the hand truck up flights of stairs which tread is trained over a wheel at one end and a pulley at the other end, and is rigid in contact with the flights of stairs but is yieldable in going around the wheel and the pulley.

Still other objects, advantages and improvements will become apparent from the following specification, taken in connection with the accompanying drawing, in which:

FIG. 1 is a side elevational view of a hand truck according to the present invention, showing the hand truck being drawn up a flight of stairs.

FIG. 2 is a perspective view of one form of the tractor tread used on the hand truck according to the present invention.

FIG. 3 is a side elevational view of the tractor tread, partially broken away to show the knee joints between the adjacent blocks of the tread.

FIG. 4 is a perspective view of a duplex tractor tread.

FIG. 5 is an end elevational view of the duplex tractor tread.

FIG. 6 is a fragmentary top view of the duplex tractor truck.

Referring now to the drawing in detail and to FIG. 1 in particular, there is shown a hand truck which is comprised in part by conventional side frame members 10 (only one being shown) and a lower transverse frame member 11. The latter is wedge-shaped in cross-section and functions as a lifting bar when picking up a load. While the hand truck is being drawn up a single step, a flight of stairs, a ramp or over a level floor or platform, this frame member functions as an abutment to prevent the load from sliding off the truck. Wheels 12 are rotatably mounted on an axle 13 which is secured to the frame members 10 at their lower ends and transversely of the latter. These wheels are shown as positioned on the outside of the frame members 10 but they may as well be positioned on the inside of the same.

According to the present invention, the wheels 12 are shouldered on their inner faces in a manner similar to a two-step cone pulley to provide integral pulley sections 12a, of lesser diameter. It is within the contemplation of this invention to make the wheels 12 and the pulley sections 12a separate elements and both freely mounted on the axle 13, if desired. The tractor tread is designated generally at 14. This tread runs at its lower end over the pulley section 12a and at its upper end over a pulley 15. The latter is freely mounted on an axle 16, which is also secured transversely of the frame members 10. The truck wheels 12 may, of course, be of any size desired.

Through the use of this invention, however, they may be made smaller in diameter than on the ordinary trucks. It is desirable, however, that the pulleys 15 be made approximately equal in diameter to the truck wheels 12, preferably less than the diameter of the latter by twice the thickness of the tractor tread 14. It will be understood that the wheels 12, tractor treads 14 and pulleys 15 are duplicated on the opposite sides of the hand truck.

The tractor tread is shown in detail in FIG. 2. It is comprised by a continuous series of identical blocks 17 of right angle parallelepiped shape. These blocks may be either metal or wood and preferably have facings 18 of leather or rubber on their outer surfaces or tops. Each block is connected to the adjacent blocks by knee joints. Along their upper right corners (FIG. 2) the blocks are formed with recesses 19, which are also of right angle parallelepiped shape. Each recess has its outer side coplanar with the outer side of the block, its ends parallel to the ends of the block and equally spaced on the opposite sides of the transverse mid-plane of the latter, and its bottom parallel to the bottom of the block. The blocks are formed with bores 20 which are concentrically positioned with the centers of the ends of the recesses 19.

Along their upper left corners (FIG. 2) each block has an elongated lug 21 formed thereon. These lugs have their tops co-planar with the tops of the blocks, their outer ends rounded, and their bottoms plane. In the lugs there are formed bores 22, which are concentrically positioned with the rounded outer ends, respectively. The recesses 19 in and the lugs 21 on the blocks are complementary, the width of the lugs being approximately equal to the width of the recesses, the height of the lugs being approximately equal to the depth of the recesses, and the length of the lugs being approximately equal to the length of the recesses, all with slight clearance. With the elongated lug 21 of one block received within the recess 19 of the adjacent block, a pin 23 is inserted through the aligned bores 20 in the block and 22 in the lug. The tractor tread is trained around the pulley section 12a and the pulley 15, with the faces of the blocks having the recesses 19 therein and the lugs 21 thereon positioned inwardly.

In FIG. 1 the truck is shown being pulled up a stairway comprised by flights or treads T and risers R. As the tractor tread 14 contacts the edge of a flight T, it will not flex inwardly but will remain rigid. However, in going around either the pulley section 12a or the pulley 15, the tractor tread will yield through one block 17 pivoting on the adjacent blocks at its opposite ends to allow for the difference in the outer and inner circumferences, as shown by the block 17 in phantom lines in FIG. 3.

In FIGS. 4, 5 and 6 there is shown a duplex tractor tread wherein two identical treads comprised by a series of blocks 17A and 17B are used. These blocks 17A and 17B are of lesser length than the blocks 17 in FIG. 3. Also, the adjoining sides of the adjacent blocks 17A—17A are in a vertical plane which is coincident with the mid-plane of one of the blocks 17B, and vice versa.

The adjacent blocks of one series are pivotally connected together by pins 23—23, which extend through aligned bores in the blocks 17A and 17B. These pins 23—23 are positioned in the bores adjacent the inner faces or tops of the blocks, equidistantly spaced on the opposite sides of the transverse mid-plane of a block in one series and likewise equidistantly spaced on the opposite sides of the plane of separation between the blocks in the other series. The use of this duplex tractor tread minimizes the danger of breakage of the tread and also provides for smooth travel of the tractor tread over the flights T of the stairway.

It is apparent that, according to the present invention, there is provided a hand truck comprising a frame, a pair of laterally spaced apart wheels rotatably mounted on said frame and at least one annular tractor tread supported by said frame for rotation in a plane generally parallel to the planes of the wheels, said tread being flexible from inward pressure but inflexible from outward pressure.

The tread preferably comprises a plurality of normally abutting block-like elements, said elements being pivotally secured to each other near their inner ends so that the elements abut each other upon application of pressure from the exterior of the tread to render the tread inflexible.

There is at least one tractor tread and preferably two such treads. The truck includes first rotatable tread supporting means (12a) generally coaxial with the wheels of the truck and second rotatable supporting means (pulley 15), the annular tractor tread being trained around said supporting means.

When the truck is moved along generally flat surfaces, the truck is supported by the wheels 12 but when the truck is being drawn up steps or similar obstructions, the truck is supported by the tractor tread.

By rendering the tractor treads flexible from inward pressure, they can bend around their supporting pulleys. On the other hand, by virtue of the fact that the treads are inflexible from outward pressure, the treads maintain their shape and can support the truck while going up steps and similar obstructions without requiring that the treads have any supports intermediate the upper and lower pulleys.

I claim:

A hand truck comprising a frame, a pair of laterally spaced apart wheels rotatably mounted on said frame, first rotatable tread supporting means generally coaxial with said wheels, second rotatable tread supporting means spaced above said wheels, and an annular tractor tread trained around said supporting means, said tractor tread comprising a plurality of abutting block-like elements, said elements being pivotally secured to each other near their inner ends to form knee joints whereby said tread is flexible from inward pressure but inflexible from outward pressure, said tractor tread being constituted by two parallel series of abutting right angle parallelepiped blocks with the planes of separation between the blocks of one series respectively coincidental with the transverse midplanes of the blocks of the other series, and vice versa, and pivot pins extending transversely through the blocks in one series and through adjacent blocks in the other series on the opposite sides of the plane of separation between the latter blocks.

References Cited in the file of this patent

UNITED STATES PATENTS

| | | |
|---|---|---|
| 905,405 | Britton | Dec. 1, 1908 |
| 1,417,693 | Savage | May 30, 1922 |
| 2,214,311 | Stevens | Sept. 10, 1940 |
| 2,564,377 | Sigurjonsson | Aug. 14, 1951 |
| 2,996,133 | La Warre et al. | Aug. 15, 1961 |

FOREIGN PATENTS

| | | |
|---|---|---|
| 835,699 | Germany | Apr. 3, 1952 |